Oct. 18, 1960
W. R. SHIELDS
2,956,771
MASS SPECTROMETER LEAK
Filed May 20, 1958
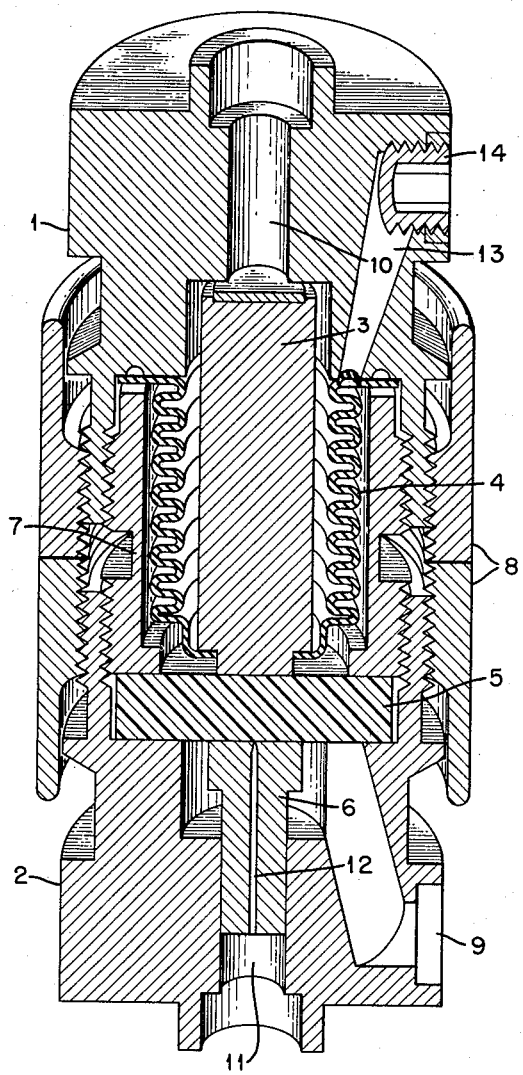
INVENTOR.
William R. Shields
BY
*Roland A. Anderson*
ATTORNEY United States Patent Office  2,956,771
Patented Oct. 18, 1960

2,956,771

MASS SPECTROMETER LEAK

William R. Shields, Washington, D.C., assignor to the United States of America as represented by the United States Atomic Energy Commission Filed May 20, 1958, Ser. No. 736,651

2 Claims. (Cl. 251—61)

The present invention relates to a simple and an improved means for precisely regulating the flow of a sample fluid to be analyzed, such as in a mass spectrometer, where a gas sample is allowed to "leak" into an evacuated region at a very low, controlled rate.

In conventional types of flow regulating valves employing a bellows, the bellows come into physical contact with the sample fluid and where such a fluid is corrosive, it will damage the bellows and eventually the bellows will have to be replaced. This corrosive action on the bellows will cause the bellows to change its operating characteristics and thus will affect the accuracy of the regulating valve. Accurate control of the flow at very low flow rates is generally difficult with bellows-type valves, which provide only a coarse control over a narrow range. Accordingly it is a primary object of my invention to provide an improved flow regulating valve which substantially prevents the feed gas from reaching the bellows.

It is another object of my invention to provide an improved fixed flow regulating valve which will accurately control the flow of a fluid sample at a very low flow rate in an evacuated region.

It is still another object of my invention to provide a flow regulating valve for controlling minute flow of gases by allowing the gas to diffuse between two mating surfaces, which valve may be fabricated easily by rough machining, and which may be easily assembled and disassembled for the purposes of servicing and inspection.

These and other objects will appear more fully in the course of the following detailed specification and the accompanying drawing wherein:

The single figure of the drawing shows a cross sectional view of my improved flow regulating valve.

The improved regulating valve of my invention comprises a valve seat with a central passage and a mating valve disk, a bellows core positioned on the side of the disk opposite the valve seat, a resilient bellows enclosing the bellows core and fastened thereto near the end adjacent the disk so as to bias the disk against the valve seat, variable pneumatic means to apply force to the bellows in the direction to close off the valve seat passage, an intake passage for the feed fluid directing said feed fluid against the face of the disk mating with the valve seat, a tubular retaining ring, and a valve shell assembly. The shell assembly is provided with upper and lower sections. The retaining ring surrounds the bellows with one end face disposed adjacent the disk such that the disk is compressed tightly between said end face and a shoulder in the lower valve shell section, effectively closing off the area about the bellows to the flow of feed fluid. The valve shell assembly further provides a central passage for applying a source of pneumatic pressure to the bellows, and a recess at one end of which the bellows is secured to prevent the control gas from escaping outside of the bellows.

Referring now to the drawing, the regulating valve comprises an upper valve shell section 1, a lower valve shell section 2, a bellows core 3, a bellows 4, a non-corrosive disk 5, preferably of Teflon, a valve seat 6, a retaining ring 7 threadably engaging both valve shell sections 1, 2, and two lock nuts 8, which engage sections 1, 2 to maintain them in position. The feed gas, consisting of the sample to be analyzed, is introduced through conduit 9. The air or control gas is introduced through conduit 10. The gas flowing into the analyzer exits from the valve via conduits 11 and 12. The feed gas entering conduit 9 tends to flow between the disk and mating valve surfaces through minute passageways formed as a result of the close tolerances of these matched surfaces, thence through valve seat 6 to conduits 11 and 12. The air or control gas introduced through conduit 10 exerts force on bellows core 3 and bellows 4, which in turn exert force on Teflon disk 5, causing said disk to exert force on valve seat 6, generally downward, said force tending to hinder flow of gas from conduit 9 to conduit 12 as a result of closer mating of the matching surfaces of the seat and resilient disk 5, with consequent reduction in the area of said minute passageways.

Therefore the amount of sample gas supplied through conduit 9, flowing under Teflon disk 5, through the opening in valve seat 6 and exiting from the conduit 12 and through conduit 11 can be stopped entirely or controlled within an extremely accurate range, utilizing the resiliency of the bellows 4 as the coarse control and the difference between the control pressure supplied through conduit 10 and the feed pressure supplied to conduit 9 as the fine control.

The disk 5 is designed to always be in engagement with the seat surface, the seat surface being made sufficiently rough for minute leakage until sufficient pressure enters the port 10 to distort the disk 5 to fill in the roughened seat surface. The amount of leakage can be accurately controlled by regulating the pressure inflow to port 10, to counteract the pressure of the sample gas introduced into port 9. The port 11 may be connected to a mass spectrometer which is under a vacuum. The sample gas fed into port 9 is also fed under a vacuum. The port 10 is connected to a source of control pressure which is above atmospheric pressure.

Conduit 13 is closed by a plug 14 which does not form an air-tight seal, but allows air to leak in so that the pressure within the passage 13 and around the bellows will change at substantially the same rate as the control pressure in conduit 10. Conduit 13 is connected to the outside of bellows 4 and the inside of the bellows and conduit 10 are thus not in communication with conduit 13. The leakage through plug 14 assures that the pressure outside the bellows 4 is always atmospheric pressure.

It is to be noted that essential to the operation of the valve described in this disclosure is the mating of the meeting faces of the Teflon disk 5 and the valve seat 6. These surfaces may be faced to concur accurately by machining, lapping or heat treatment. After these surfaces are made to concur accurately, they are then made sufficiently rough to provide for the minute passageways as discussed above.

The regulating valve described above may be modified by using various controllers with the disk and seat disclosed without departing from the spirit of this invention, which has been described by way of illustration rather than limitation.

What is claimed is:

1. An improved flow regulating valve for operation in an evacuated system comprising a valve seat with a central passage, a resilient mating valve disk, said valve seat and valve disk being provided on their mating sides with minute passageways, and said seat and disk being in contact with each other, a bellows core positioned on the side of the disk opposite the valve seat, a resilient bellows enclosing the bellows core and fastened thereto near the end adjacent the disk so as to bias the disk against the valve seat, means for directing variable fluid pressure to the bellows to apply force to the bellows core in the direction to close off the valve seat passage, a valve shell assembly defining an intake passage about said seat adapted to direct feed gas against the face of said disk mating with said valve seat, whereby the amount of leakage through said minute passageways can be regulated by selectively regulating said variable fluid pressure, said valve shell assembly being provided with a shoulder to receive said disk at the inner end of said intake passage, and a tubular retaining ring surrounding the bellows and provided with one end face disposed against the periphery of the disk such that the disk is compressed tightly by the said end face and valve shell assembly shoulder to form a vacuum seal which prevents fluid feed gas from said intake passage from reaching said bellows.

2. An improved flow regulating valve comprising a lower shell assembly provided with a central outlet passage, a shoulder, and a threaded collar, a valve seat provided with a central port and passage and disposed in said outlet passage of said lower assembly, a mating valve disk, said valve seat and valve disk being provided on their mating sides with minute passageways, and said seat and disk being in contact with each other, a bellows core positioned on the side of the disk opposite the valve seat, a resilient bellows enclosing said core and fastened thereto to bias the disk against the valve seat, an inner externally threaded retaining ring enclosing said core and bellows and having one end face disposed against the periphery of said disk, said ring engaging said threaded collar to compress said disk against said shoulder, an upper shell assembly provided with a central inlet passage, a shoulder, and a threaded collar, said inlet passage of said upper shell assembly adapted to direct variable fluid pressure to said bellows and core in the direction to close off said valve seat passage, an intake passage about said valve seat in said lower shell assembly, said lower shell assembly intake passage adapted to direct feed gas against the face of said disk mating with said valve seat such that feed gas tends to flow between said disk and mating valve seat surface through said minute passageways, thence into said central port of said valve seat, the amount of flow through said passageways being a function of the differential pressure between said sample feed gas and the pressure exerted on said bellows and its core by said variable fluid pressure, said feed gas being effectively prevented from entering the area of said bellows due to a seal effected by compression of said valve disk between the end face of said inner tubular retainer ring end face and matching valve shell shoulder.

References Cited in the file of this patent
UNITED STATES PATENTS

| | | |
|---|---|---|
| 1,786,844 | Hesselmann | Dec. 30, 1930 |
| 2,387,792 | Holmes | Oct. 30, 1945 |